United States Patent [19]

Hayes et al.

[11] Patent Number: 5,904,888
[45] Date of Patent: May 18, 1999

[54] CURABLE COMPOSITIONS

[75] Inventors: Barry James Hayes, Little Eversden; Paul Terrence Wombwell, Royston, both of United Kingdom; Philip David Willis, Rheinfelden, Switzerland

[73] Assignee: Ciba Specialty Chemicals Corporation, Tarrytown, N.Y.

[21] Appl. No.: 08/973,649

[22] PCT Filed: Jun. 18, 1996

[86] PCT No.: PCT/GB96/01524

§ 371 Date: Dec. 18, 1997

§ 102(e) Date: Dec. 18, 1997

[87] PCT Pub. No.: WO97/00915

PCT Pub. Date: Jan. 9, 1997

[30] Foreign Application Priority Data

Jun. 20, 1995 [GB] United Kingdom .................. 9512533

[51] Int. Cl.$^6$ ...................................................... C08J 5/00
[52] U.S. Cl. ................... 264/331.12; 264/328.1; 523/445; 528/94; 528/110; 528/112; 528/117
[58] Field of Search ....................... 523/455; 264/331.12, 264/328; 528/94, 110, 112, 117

[56] References Cited

U.S. PATENT DOCUMENTS

| 4,043,969 | 8/1977 | Sporck ........................... 260/37 |
| 4,107,353 | 8/1978 | Karoly et al. .................... 427/54 |
| 4,324,713 | 4/1982 | Kita et al. ...................... 523/457 |
| 4,444,924 | 4/1984 | Grimmer ......................... 523/445 |

FOREIGN PATENT DOCUMENTS

| 0318325 | 5/1989 | European Pat. Off. . |
| 1323343 | 7/1973 | United Kingdom . |
| 9222422 | 12/1992 | WIPO . |

*Primary Examiner*—Melvyn I. Marquis
*Assistant Examiner*—D. Aylward
*Attorney, Agent, or Firm*—David R. Crichton; Michele A. Kovaleski

[57] ABSTRACT

A two-component system for producing two or more different curable mixtures in which the first component A is common to each mixture and comprises:

1. a liquid epoxy
2. an acid anhydride hardener and
3. at least one filler and the second component B is selected from two or more different components B, each of which comprises:

1. an accelerator, and optionally
2. a colourant, and optionally
3. a non-volatile solvent/extender for the accelerator
4. a flexibiliser for the epoxy-anhydride cure
5. a acid anhydride hardener.

15 Claims, No Drawings

CURABLE COMPOSITIONS

The present invention relates to a two part system for producing a curable epoxy resin composition.

Epoxy resin systemis used for making cast products are conventionally supplied as 1-, 2-, 3- or even 4- part compositions which are mixed immediately before use. The most popular systems are 2-part systems, one part containing the epoxy resin and the other part containing the hardener.

Various types of hardener are known, but when making moulded products, it is useful if the mixture of the two parts do not cure immediately, but had a useful life at the mixing temperature.

When processing to make a cast article, the resin is usually first pre-heated in an oven at 40° C. to 100° C., e.g. about 90° C. The hardener is then added and the mixture is then mixed under vacuum to de-aerate it. Typically the mixture will have a temperature of 65° C. and when using an acid anhydride hardener, have a useable life of about 3 hours at 65° C.

A typical epoxy resin/anhydride casting resin system comprises about 30–45% by volume of epoxy resin, 25–35% by volume of anhydride hardener, and 30–45% by volume of mineral filler, together with minor amounts of cure accelerator and other additives.

For technical and cost reasons it is desirable to maximise the level of mineral filler in the system. However, the achievement of high loadings by the caster is complicated for various reasons.

The handling of mineral fillers presents health hazards and requires the skills and equipment available in a resin manufacturer's or formulator's plant but not normally in a casting plant.

Anhydride casting resin systems intended for rapid curing at 100°–200° C. do not usually have sufficient stability at ambient temperatures to permit manufacture and supply as filled single part products. Supply and storage at low temperatures might overcome this problem but incurs additional costs.

With the normal basic resin: hardener mixing ratio being close to 1:1 it is not possible to accommodate the high level of total filler in the resin alone; such a mixture would be too intractable to process. The resin can accommodate only about half as much filler as can the overall resin-hardener mixture.

Whereas manufacture and supply of a resin-filler premix is a simple and commonly adopted technique, prefilled anhydride hardeners are subject to sever filler settlement and hard packing because of the low viscosity of the anhydride itself. Furthermore the separate filling of both resin and hardener is inefficient because it involves an additional processing step with concomitant costs. Moreover, if the caster requires numerous colour variants then economies of scale in the manufacture of pre-filled resins are sacrificed. The cost is increased further if the resins are to be handled in bulk since a number of storage containers will be needed.

It is apparent from the above that great efficiencies could be achieved if the epoxy resin system could be supplied in the form of a two part composition wherein one part constituted less than 25% and preferably less than 10% of the final composition and incorporated the variable elements, principally the colour.

We have now developed such a system wherein both parts display adequate stability for storage and transport at normal ambient temperatures.

Accordingly the present invention provides a two-component system for producing two or more different curable mixtures in which the first component A is common to and comprises 75 to 99.8% by volume of each mixture and comprises:

1. a liquid epoxy resin
2. an acid anhydride hardener and
3. at least one filler and the second component B which comprises 0.2 to 25% by volume of each mixture is selected from two or more different components B, each of which comprises:

1. an accelerator, and optionally
2. a colourant
3. a non-volatile solvent/extender for the accelerator
4. a flexibiliser for the epoxy-anhydride cure
5. ac acid anhydride hardener.

Either one or both of components A and B may also contain other minor additives.

Component A may be made by mixing the components in any order and at any temperature subject to two criteria, namely that the mixture viscosity can be accommodated by the mixer and that the temperature is substantially below the temperature of onset of the cure reaction. A margin of 50° C. is widely regarded as a desirable margin of safety in the latter respect A preferred process for producing a formulation containing a large amount of filler is to charge warm epoxy resin to a vessel, mix in any antioxidant and other minor additives, then about half of the filler, then all the hardener then, finally, all the remaining filler. The temperature may be allowed to fall as the filler and hardener are added.

Suitable epoxides include polyglycidyl esters, polyglycidyl esters, and cycloaliphatic epoxides.

Epoxides which may be employed are preferably those containing, on average, more than one group of formula

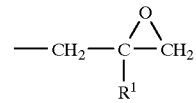

directly attached to an atom or atoms of oxygen or nitrogen, where $R^1$ denotes a hydrogen atom or a methyl group.

As examples of such epoxides may be mentioned polyglycidyl and poly(beta-methylglycidyl)esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic polycarboxylic acids, e.g. oxalic acid, glutaric acid, adipic acid, pimelic acid, suberic acid, sebacic acid, or dimerised or trimerised linoleic acid; from cycloaliphatic polycarboxylic acids such as tetrahydrophthalic acid, 4-methyltetrahydrophthalic acid, hexadrophthalic acid, and 4-methylhexahydrophthalic acid; and from aromatic polycarboxylic acids such as phthalic acid, isophthalic acid, and terephthalic acid.

Further examples are polyglycidyl and poly(beta-methylglycidyl)ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as glycol, diethylene glycol, and higher poly(oxyethylene)glycols, propane-1,2-diol and poly(oxypropylene)glycols, propane-1,3-diol, butane-1,4, poly (oxytetramethylene) glycols, pentane-1,5-diol, hexane-1,6-diol, hexane-2,4,6-triol, glycerol, 1,1,1-trimethylol-propane, pentaerythritol, sorbitol, and polyepichlorohydrins; from cycloaliphatic alcohols such as resorcitol, quinitol, bis(4-hydrocycyclohexyl)methane, 2,2-bis(4-hydroxycyclohexyl) propane, and 1,1-bis(hydroxymethyl)cyclohex-3-ene; and from alcohols having aromatic nuclei, such as 2,4-(dihydroxymethyl)benzene. They may also be made from mononuclear phenols, such as resorcinol and hydroquinone, and from polynuclear phenols, such as bis(4-hydroxyphenyl)methane, 4,4'-dihydroxydiphenyl, 1,1,2,2-tetrakis(4-hydroxyphenyl)ethane, 2,2- bis(4-hydroxyphenyl)-propane, 2.2-bis(3,5-dibromo-4-hydroxyphenyl)propane, and novalaks formed from aldehydes such as formaldehydes, acetaldehyde, chloral, and furfuraldehyde, with phenols such as phenol itself, and phanol substituted in the ring by chlorine atoms or by alkyl groups each containing up to nine carbon atoms, such as 4-chlorophenol, 2-methylphenol, and 4-tert-butylphenol.

Epoxides in which some or all of the epoxide groups are not terminal may also be employed, such as vinylcyclohexane dioxide, limonene dioxide, dicyclopentadiene dioxide, 4-oxatetracyclo $[6,2.1.0^{2,5}.0^{3,5}]$undec-9-yl glycidyl ether, the bis(4-oxatetracyclo $[6.2.10^{2,7}.0^{3,5}]$undec-9-ether of ethylene glycol, 3,4-epoxycyclohexylmethyl 3',4'-epoxycyclohexane carboxylate and its $6,6^1$dimethyl derivative, the bis(3,4-epoxycyclohexane-carboxylate) of ethylene glycol, 3-(3,4-epoxycyclohexyl)-8.9-epoxy-2,4-dioxaspire[5,5]undecane, and epoxidised butadienes or copolymers of butadiene with ethylenic compounds such as styrene and vinyl acetate.

Epoxide resins having the 1,2-epoxide groups attached to different kinds of hetero atoms may be employed, e.g. the glycidyl ether-glycidyl ester of salicylic acid. If desired, a mixture of epoxide resins may be used.

Preferred epoxides are polyglycidyl esters, polyglycidyl esthers of 2,2-bis(4-hydroxyphenyl)propane, of bis(4-hydroxyphenol)-methane or of a novalak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, and 3,4-epoxycyclohexylmethyl 3',4'-epoxycyclohexane carboxylate.

The epoxy resin should be pure enough and have a low hydroxyl content so as to give stability in the presence of the hardener.

The hardener is an acid anhydride. Suitable anhydrides are either liquid, or solids. Anhydride hardeners suitable for use include methyltetrahydrophthalic anhydrides, hexahydrophthalic anhydride, methylhexahydrophthalic anhydrides, methylendo methylenetetrahydrophthalic anhydrides, tetrahydrophthalic anhydride, phthalic anhydride, alkenesuccinic anhydrides, maleic anhydride, succinic anhydride, glutaric anhydride or fumaric anhydride. Mixtures of such anhydrides may be used advantageously to depress the individual melting point and thereby repress crystallisation of anhydride out component A.

The anhydride hardener should have a low acid content in order to ensure stability of the formulation.

A wide range of fillers may be used, both fine and coarse particles. The filler may be inorganic such as china clay, calcined clay, quartz flour, cristobalite, chalk, precipitated calcium carbonate, mica powder, glass powder, glass beads, powdered glass fibre, aluminium oxide and magnesium hydroxide, or organic such as powdered poly(vinylchloride), nylon, polyethylene, polyester or cured epoxy resin. Flame retardant fillers such as trihydrated aluminia may also be used.

Mixtures of fillers may be used. For example in order to give granite-like effect in a moulded product mixture of calcined china clay and black mica of relatively large particle size may be used, for instance about 0.5 mm.

The filler may also have its surface treated with a silane or organotitanate coupling agent In general fillers having a particle size of from 1 to 10,000 microns may be used, depending on the desired effect. The amount of filler may be from 20–65% by volume of the total mixture, preferably from 40–60% by volume.

In order to assist in preventing any settling of the filler, a thixotropic agent may be added, provided that the final composition exhibits sufficient fluidity to be transferred through pipes and into moulds by application of pressures of less than 5 bar.

Suitable thixotropic agents include highly dispersed silicas, bentonite and silicates or organic compounds such as hydrogenated castor oil. It may be used in amounts of from 0.5 to 10 parts by weight per 100 parts by weight of epoxy resin, preferably 1 to 3 parts by weight.

Each component B may be made by mixing the components in any order and at any temperature.

The inclusion of a solvent/extender and/or acid anhydride hardener enables solid accelerators to be used and permits the ratio of compound B to component A to be increased to facilitate the use of commercially available meter-mixing equipment or to avoid the need for sensitive weighing equipment.

A wide range of accelerators may be used as they do not need to be stable in the epoxy resin.

Examples of suitable accelerators for component B are tetiary amines, di-azabicycloundecene or imadazoles salts thereof with phenols or acids, zinc octoate, stannous octoate, alkali metals alkoxides, quaternary ammonium or phosphonium compounds and latent accelerators.

Suitable quaternary ammonium and phosphonium compounds include halides and acetates such as tetramethylammonium chloride, tetraethylammonium chloride, benzyltrimethylammonium chloride, dodecylbenzyldiethylammonium chloride, tetramethylammonium acetate, tetrabutylphosphonium bromide, ethyltriphenylphosphonium chloride and methyltriphenyl phosphonium bromide.

Suitable latent accelerators include boron trihalide complexes of alkyldimethylamines having 1 to 18 carbon atoms in the alkyl groups, for example trimethylamine or n-decyldimethylamine or of aralkyldimethylamines, for example benzyldimethylamine. The boron trihalide is preferably boron trichloride. Other suitable accelerators include complexes of heavy metal carboxylates with imidazoles, or non-latent amine or imidazole accelerators protected by microencapsulation in heat sensitive barriers or by adsorption into molecular sieves.

The colourant may be a dyestuff or an organic or inorganic pigment or mixtures thereof.

Suitable non-volatile solvents/extenders for the accelerator include high-boiling liquid hydrocarbons, phthalate ester plasticisers, cyclic lactones or lactams, mono- or polyfunctional phenols.

Phenol novolac resins, high boiling point glycol- or polyglycol ethers.

Suitable flexibilisers include polyols, both aliphatic and cyclic or plycarboxylic acids. Such polyols and polycarboxylic acids may consist of hydroxyl- or carboxyl- terminated polyesters respectively. Polycarboxylic acid flexibilisers may be formed in-situ by compounding polyols and carboxylic anhydrides into Component B and allowing these to react.

Other additives conventionally employed in moulding resin compositions may also be included on one or both of components A and B. Examples of such additives are fibres such as glass and carbon fibres, flame retardants, antioxidants, light stabilisers, UV absorbers, surfactants, anti-foaming agents, toughening agents such as rubbers and core-shell polymers, and other stabilisers such as lower carboxylic acids.

Examples of suitable antioxidants include alkylated monophenols, alkylthiomethylphenols, hydroquinones and alkylated hydroquinones, hydroxylated thiodiphenyl ethers, alkylidenebisphenols, O-, N- and S-benzyl compounds, hydroxybenzylated malonates, hydroxybenzyl aromatics, triazine compounds, benzylphosphonates, acylaminophenols, esters and amides of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid and esters of 3,5-di-tert-butyl-4-hydroxyphenyl acetic acid.

Examples of suitable UV absorbers and light stabilisers include 2-(2'-hydroxyphenyl)benzotriazoles, compounds, sterically hindered amines, oxalic acid diamides and 2-(2-hydroxyphenyl)-1,3,5-triazines.

The system of the present invention may be used to make moulded articles by what is called Automatic Pressure Gelation Process (APG). In this process which is described for example in GB 1323343 and EP 0333456 an epoxy resin and a curing agent are mixed at a temperature at which they are liquid, usually 40–70° C. The mixture is then passed, under slight pressure, into a mould which is at a high enough temperature for gelling and curing to take place. Further mixture is supplied to the mould under the application of pressure to compensate for shrinkage of the composition until the composition has set.

In order to cure the composition, components A and B are mixed together and then passed to a mould which is at a high enough temperature to cure the composition, e.g. at a temperature of from 100° to 200° C. The actual temperature needed depends on the nature of the compound used.

Components A and B are mixed in a suitable ratio to enable complete curing to occur. This usually means providing 0.5–1.1 mol of anhydride and optionally 0.1–0.25 mol of acid or polyol per mol of epoxy. The amount of accelerator may be up to 5 parts by weight preferably 0.2 to 0.8 parts by weight per 100 parts by weight of liquid epoxy resin.

To achieve this component A is used in an amount of 75 to 99.8% by volume and component B in an amount of 0.2 to 25% by volume.

The polyol or polyacid acts not only as a carrier for the accelerator and colourant but also prevents decarboxylation of anhydride during high temperature gelation.

The formulations used in the present invention allow the moulding process to be carried out at high temperatures of up to 200° C. without decarboxylation. This allows for fast production. The moulded products can also be demoulded easily because they soon become tough enough once the curing has started. The final moulded products also have very good mechanical and electrical insolation properties and chemical resistance.

The process of the invention may be used for the production of mouldings having thin or thick walls (cross sections). It is also particularly suitable for the production of mouldings having a large surface area, at least one large linear dimension or a complex shape. The process may be used, for instance, in the moulding of domestic sanitary ware such as sinks, bathsm shower trays and basins, sheet slabstock for use in the production of articles such as domestic worktops, chemically resistant containers such as tanks and parts such as pumps, valves and pipes for handling corrosive fluids and impact-resistant mouldings for use in cars and other vehicles, and electrical applications.

A manufacturer of moulded products can operate according to the invention by having one large contained for component A and a number of small containers for different components B. The desired product car, be made by simply selecting the appropriate component B for mixing with compound A, e.g. to produce a desired colour. No storage problems arise as both components A and B are stable for 6–12 months at room temperature.

The invention is illustrated by the following Examples.

EXAMPLE 1

Viscosity vs time measurements were carried out at 25° C. on component A comprising 18.1% liquid Bisphenol A epoxy resin, 14.9% anhydride hardener blend, 66.1% silica flour filler and 0.9% antisettlement agent. Measurements were made using a Brookfield DV 11 viscometer with spindle 7 at 10 rpm. The viscosity remained constant for the test period of 70 days at 11 to 11.5 Pas.

EXAMPLE 2

Component A is made from 54.2% liquid Bisphenol A epoxy resin and 45.8% anhydride hardener blend (comprising 30% methylhexahydrophthalic anhydride and 70% hexahydrophthalic anhydride).

Component $A^1$ was prepared on one day and component $A^{11}$ was prepared 30 months later.

Component B is made from 36.6% benzyltriethylammonium chloride and 63.4% ethylene glycol.

Gel times were measured on the day component $A^{11}$ was made using a hotblock at 150° C. and a Techne gel timer. Measurements were made on 7.5 g of a mixture of 100 parts by weight component $A^1$ or $A^{11}$ and 2.2 parts by weight of component B.

$A^1$+B 3 mins at 150° C.

$A^{11}$+B 2 mins at 150° C.

It can be seen that there is little difference in the gel times of the two mixtures and shows the stability of the base matrix resin.

We claim:

1. A multi-part system for producing curable mixtures comprising at least a first mixture and a second mixture and/or a third mixture, wherein the first mixture consists of a component A and the second and third mixtures consist of a component B as follows, in which the component A is present at 75 to 99.8% by volume of said curable mixture and comprises:

A1. a liquid epoxy

A2. an acid anhydride hardener and

A3. at least one filler and the component B is present at 0.2 to 25% by volume of said curable mixtures, wherein the second mixture contains component B in different volumetric amounts or different combinations of components B1 through B5 than component B in the third mixture, wherein component B is a mixture comprising:

B1. an accelerator, and optionally

B2. a colourant, and optionally

B3. a non-volatile solvent/extender for the accelerator

B4. a flexibiliser suitable for epoxy-anhydride cure systems and

B5. an acid anhydride hardener and optionally at least one of said components B contains a colourant.

2. A system as claimed in claim 1 in which the liquid epoxy resin is a polyglycidyl ester, polyglycidyl ether or cycloaliphatic epoxide.

3. A system as claimed in claim 1 in which the acid anhydride hardener has a low acid value to ensure storage stability.

4. A system as claimed in claim 1 in which the filler has a particle size of from 1 to 10000 microns.

5. A system as claimed in claim 1 in which component A comprises 20–65% by volume of filler.

6. A system as claimed in claim 1 in which the accelerator is a tertiary amine or imidazole or di-azabicycloundecene or a salt thereof with an acid or phenol, zinc octoate, an alkali metal alkoxide, a quaternary ammonium or phosphonium compound or a latent accelerator.

7. A system as claimed in claim 1 in which the non-volatile solvent/extender is a high boiling hydrocarbon, a phthalate ester plasticiser, cyclic lactone or lactam, mono- or poly-functional phenol, novalak resin, a high boiling point glycol or polyglycol ether.

8. A system as claimed in claim 1 in which the flexibiliser is an aliphatic or cyclic polyol or a polycarboxylic acid.

9. A system as claimed in claim 1 in which one or both of components A and B also contain one or more additives conventionally employed in moulding resin compositions selected from the group of fibers, flame retardants, antioxidants, light stabilizers, ultraviolet light absorbers, surfactants, anti-foaming agents, toughening agents, stabilizers and mixtures thereof.

10. A process for making a cured composition which comprises mixing at least a first mixture and a second mixture and/or a third mixture for producing curable mixtures, wherein the first mixture consists of a component A and the second and third mixtures consist of a component B as follows, in which the first component A is present at 75 to 99.8% by volume each of said curable mixture and comprises:

A1. a liquid epoxy

A2. an acid anhydride hardener and

A3. at least one filler and the component B is present at 0.2 to 25% by volume of said of curable mixtures, wherein the second mixture contains component B in different volumetric amounts or different combinations of components B1 through B5 than component B in the third mixture, wherein component B is a mixture comprising:

B1. an accelerator, and optionally

B2. a colourant, and optionally

B3. a non-volatile solvent/extender for the accelerator

B4. a flexibiliser suitable for epoxy-anhydride cure systems and

B5. an acid anhydride hardener and optionally at least one of said components B contains a colourant and then passing at least one of said curable mixtures to a mould at a high temperature which is high enough to cure the composition.

11. A process as claimed in claim 10 in which components A and B are mixed and passed under slight pressure to a mould which is at a high enough temperature for curing to take place and where further mixture supplied under pressure to compensate for shrinkage of the composition.

12. A multipart system according to claim 1 wherein at least one said components B contains a colourant.

13. A multipart system according to claim 1 wherein only one of said components B contains a colourant.

14. A multipart system according to claim 10 wherein at least one said components B contains a colourant.

15. A multipart system according to claim 10 wherein only one of said components B contains a colourant.

* * * * *